(No Model.)
E. J. BARBIER.
PROCESS OF TREATING BISULPHATE OF SODA.
No. 484,546. Patented Oct. 18, 1892.
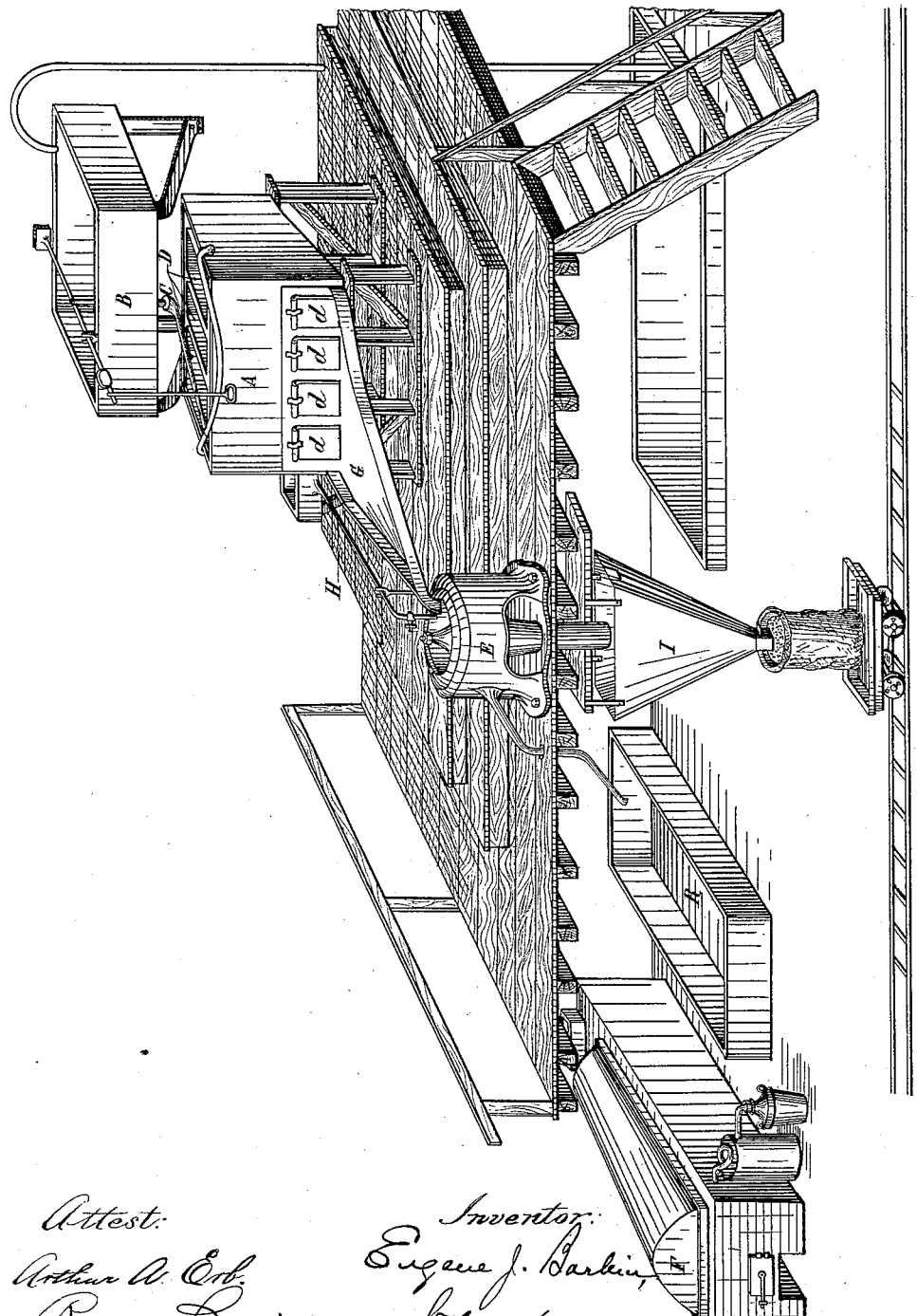

UNITED STATES PATENT OFFICE.

EUGÉNE JEAN BARBIER, OF PARIS, FRANCE.

PROCESS OF TREATING BISULPHATE OF SODA.

SPECIFICATION forming part of Letters Patent No. 484,546, dated October 18, 1892.

Application filed June 21, 1892. Serial No. 437,456. (No specimens.) Patented in France September 7, 1891, No. 215,954; in Spain January 22, 1892, No. 12,812, and in Belgium March 4, 1892, No. 98,624.

*To all whom it may concern:*

Be it known that I, EUGÉNE JEAN BARBIER, of the city of Paris, France, have invented a Process for the Treatment of Bisulphate of Soda, (for which I have obtained Letters Patent in France for fifteen years, dated September 7, 1891, No. 215,954; in Belgium for fifteen years, dated March 4, 1892, No. 98,624, and in Spain for ten years, dated January 22, 1892, L. 14, F. 403, No. 12,812,) of which the following is a full, clear, and exact description.

This invention has reference to a process for the production of neutral sulphate of soda and sulphuric acid from bisulphate of soda, whereby this compound, which is largely produced in the manufacture of nitric acid, is rendered of greater commercial value than heretofore. For this purpose I subject a solution of bisulphate of soda to a considerable reduction of temperature by means of suitable refrigerating apparatus and then separate the crystals of neutral sulphate of soda thus produced from the mother-liquor containing sulphuric acid, which is afterward concentrated to a suitable strength. The proportion of bisulphate of soda to water will vary with the amount of free acid contained in the bisulphate employed; but it should be such that the resulting solution will have a strength of from about 35° to 45° Baumé to insure efficient working. The solution is subjected to a series of operations in apparatus the general arrangement of which is shown in perspective in the accompanying drawing.

The accompanying drawing represents in perspective an apparatus suitable for use in carrying out the invention.

The solution is first introduced into a refrigerator A, wherein it is reduced to a low temperature.

The refrigerating machine or apparatus employed to cool this refrigerator may be of any suitable kind, and is therefore not shown in the drawing. The refrigerator A contains a number of troughs D of suitable material—as, for example, cast-iron or lead or sheet metal. The number and dimensions of these troughs will vary with the capacity of the apparatus. Thus, for example, for an apparatus capable of treating five thousand kilograms of bisulphate of soda per day, four troughs of two hundred liters each may advantageously be employed, or eight troughs of one hundred liters each. The use of a number of troughs enables the working operations to be in some measure continuous, because while some troughs are being discharged or charged the contents of the others can be subjected to the cooling action of the refrigerator. The charging of these troughs is effected by the aid of an intermediate reservoir B, provided with a distributing-pipe C. The reservoir B is fed by means of a suitably-arranged supply-pipe or liquor-elevator. In proportion as the liquid to be treated has undergone the desired refrigeration in the troughs D it is discharged therefrom by opening doors or valves $d\ d$, provided at the front or below the apparatus. The liquid then flows into a collecting vessel or spout G, which conducts it into a separating and drying machine E, that may advantageously be a hydro-extractor or centrifugal machine, as shown.

The process is carried out as follows: The solution of bisulphate of a strength of from about 35° to 45° Baumé is introduced into the troughs D. Under the cooling action of the refrigerating-machine the temperature of the solution falls quickly. The decomposition of the bisulphate takes place in proportion to such fall of temperature, and when a thermometer indicates about 10° centigrade in the solution the decomposition is completed, or nearly so. The decomposition will be facilitated by agitating the liquid from time to during cooling. The contents of the trough are then discharged by opening the corresponding door or valve $d$ into the drying-machine E, which is then put in rapid motion. The complete separation of the crystallized neutral sulphate of soda containing ten equivalents of water and the mother-liquors charged with sulphuric acid is thus effected, the mother-liquors being collected in a reservoir R. When this separation has been effected and while the drying-machine is still rotating, the crystals contained therein are washed, in order to remove therefrom the small amount of acid which still adheres to them. This washing is effected with water supplied to the drying-machine by the pipe H. The washing-waters are collected separately and serve to dissolve a further quantity of bisulphate. The washed crystals are allowed to fall through a hopper I into a suitable receptacle arranged below for the purpose. By this means crystallized sulphate of soda having ten equivalents of water and mother-liquors having a strength from 30° to 42° Baumé are separately obtained.

The crystallized sulphate of soda may be sold as such, or it may be converted into anhydrous material, according to requirement.

The mother-liquors of from 30° to 42° Baumé may in certain cases be utilized without further treatment for the preparation of the various sulphates—such as those of iron, copper, magnesia, &c.—and they may be concentrated to 50°, or to 60°, or even to 66° Baumé. To concentrate them to 50° centigrade, they are simply passed into a concentrating-vessel F, heated by a fire on a grate below, or waste heat may be employed for this purpose. These mother liquors, concentrated to 50°, deposit on cooling a small quantity of undecomposed bisulphate which is collected and added to a further quantity of bisulphate to be treated, as described.

The decanted acid may be used for various purposes—as, for example, in the manufacture of superphosphates. If it be desired to reuse the said mother-liquors in the manufacture of nitric acid, the concentration must be carried to 60° or to 62° Baumé for the manufacture of commercial nitric acid, and to 66° Baumé for the manufacture of strong nitric acid. To render this concentration easy and practical, there is added to the mother-liquors collected in the reservoir R from the drying-machine about thirty-five to forty per cent. of sulphuric acid of 66°, or, as is more advantageous, mother-liquors that have already been concentrated to this strength. This addition, by concentrating the mother-liquors, causes the deposition therefrom of a great part of the bisulphate present therein. The clear acid is then drawn off and concentrated in the concentrating apparatus F—for instance, up to 60° or to 66°, as desired. The mother-liquors, instead of being concentrated in the manner described, can also be utilized by distilling them in a retort of suitable material—for example, cast-iron. After collecting separately the weak acids which are distilled off at the outset of the operation there is obtained as a final distillate a pure highly-concentrated acid of great commercial value.

I claim—

1. The process of treating bisulphate of soda to obtain neutral sulphate and sulphuric acid, said process consisting in reducing by refrigeration the temperature of the bisulphate until decomposition takes place and separating the crystallized neutral sulphate from the mother-liquor, substantially as described.

2. The described process of treating bisulphate of soda by reducing the temperature by refrigeration until decomposition is effected, separating the sulphuric acid from the crystallized sulphate, and concentrating the mother-liquor, substantially as described.

3. The process of treating bisulphate of soda by reducing its temperature by refrigeration until decomposition takes place, separating the crystals formed from the mother-liquor, adding to the latter concentrated sulphuric acid to precipitate the undecomposed bisulphate, and removing the latter, substantially as set forth.

The foregoing specification of my process and apparatus for the treatment of bisulphate of soda signed by me this 7th of June, 1892.

EUGÉNE JEAN BARBIER.

Witnesses:
ROBT. M. HOOPER,
ERNEST PIERRE EILYSIE.